(12) United States Patent
Miron

(10) Patent No.: US 10,965,693 B2
(45) Date of Patent: Mar. 30, 2021

(54) METHOD AND SYSTEM FOR DETECTING MOVEMENT OF MALWARE AND OTHER POTENTIAL THREATS

(71) Applicant: FENROR7 LTD, Tel Aviv (IL)

(72) Inventor: Yaniv Miron, Petach Tikva (IL)

(73) Assignee: FENROR7 LTD, Herzliya (IL)

( * ) Notice: Subject to any disclaimer, the term of this patent is extended or adjusted under 35 U.S.C. 154(b) by 62 days.

(21) Appl. No.: 16/099,699

(22) PCT Filed: Jul. 24, 2017

(86) PCT No.: PCT/IL2017/050830
§ 371 (c)(1),
(2) Date: Nov. 8, 2018

(87) PCT Pub. No.: WO2018/025258
PCT Pub. Date: Feb. 8, 2018

(65) Prior Publication Data
US 2019/0190930 A1 Jun. 20, 2019

Related U.S. Application Data

(60) Provisional application No. 62/369,110, filed on Jul. 31, 2016.

(51) Int. Cl.
*H04L 29/06* (2006.01)
*H04L 12/46* (2006.01)

(52) U.S. Cl.
CPC ...... *H04L 63/1416* (2013.01); *H04L 12/4625* (2013.01); *H04L 63/0227* (2013.01); *H04L 63/0236* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 2005/0018618 A1 | 1/2005 | Mualem et al. | |
| 2010/0195538 A1* | 8/2010 | Merkey | H04L 43/02 370/255 |
| 2013/0034100 A1* | 2/2013 | Goyal | G06N 5/027 370/392 |
| 2013/0227674 A1* | 8/2013 | Anderson | H04L 63/20 726/15 |
| 2014/0013434 A1 | 1/2014 | Ranum et al. | |
| 2015/0372980 A1* | 12/2015 | Eyada | H04L 63/1416 726/1 |
| 2016/0088000 A1* | 3/2016 | Siva Kumar | H04L 63/10 726/23 |

* cited by examiner

*Primary Examiner* — William J. Goodchild
(74) *Attorney, Agent, or Firm* — Patshegen IP LLC; Moshe Pinchas

(57) ABSTRACT

Methods and systems, including devices, which allow for the rapid detection of malware and other threats, such as malicious intrusions and attacks, are disclosed. These methods and systems, including devices, detect malware and other threats by detecting and analyzing lateral movement of the malware and other threats, once having entered a network, such as an enterprise network.

36 Claims, 13 Drawing Sheets

| ID 1  | RULE 1  | 2 | 3 | 4  | 5  |
|-------|---------|---|---|----|----|
| ID 2  | RULE 2  | 6 | 9 | 14 | 5  |

◦
◦
◦

| ID 14 | RULE 14 | 7 | 9 | 45 | 22 |
|-------|---------|---|---|----|----|

◦
◦
◦

| ID 45 | RULE 45 |   |   |    |    |
|-------|---------|---|---|----|----|
| ID 46 | RULE 46 |   |   |    |    |

FIG. 5A

| ID 1  | RULE 1  | 2 | 3 | 4      | 5  |
|-------|---------|-------|---|--------|----|
| ID 2  | RULE 2  | 6     | 9 | 14 | 5  |

◦
◦
◦

| ID 14 | RULE 14 | 7 | 9 | 45 | 22 |
|-------|---------|---|---|--------|----|

◦
◦
◦

| ID 45 | RULE 45 |   |   |    |    |
|-------|---------|---|---|----|----|
| ID 46 | RULE 46 |   |   |    |    |

FIG. 5B

|                | Malicious 100K | Benign 100K |
|----------------|----------------|-------------|
| Q1- How many "20" in the packet? | 755 | 122 |
New Packet = 535
FIG. 7A
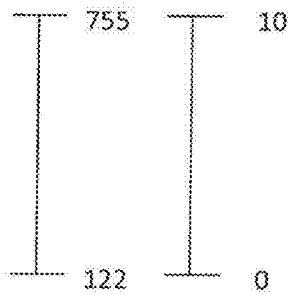
FIG. 7B
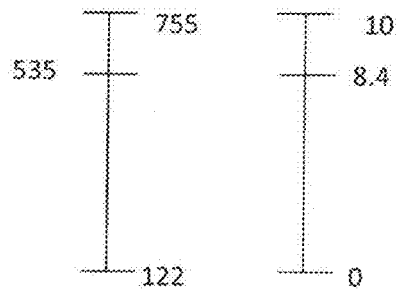
FIG. 7C
| RULE | LITERAL VALUE (LV) | WEIGHT |
|------|--------------------|--------|
| Q1 | 8.4 | 2 |
| Q2 | 6.3 | 5 |
| Q3 | 5.4 | 1 |
| Q4 | 1.2 | 9 |
| * | | |
| * | | |
| * | | |
| Qn | 6.6 | 4 |
| TOTALS (TOT) | LVTOT | INT (INTEGER) |
FIG. 7D

METHOD AND SYSTEM FOR DETECTING MOVEMENT OF MALWARE AND OTHER POTENTIAL THREATS

CROSS REFERENCES TO RELATED APPLICATIONS

This application is related to and claims priority from commonly owned U.S. Provisional Patent Application Ser. No. 62/369,110, entitled: Method and System for Detecting Movement of Malware and Other Potential Threats, filed on Jul. 31, 2016, the disclosure of which is incorporated by reference in its entirety herein.

TECHNICAL FIELD

The present invention relates to methods and systems for detecting automatic and manual malware and other threats, such as malware, malicious intrusions, exploits, and attacks, and other harmful software, both potential and actual, in order to rapidly and effectively detect them.

BACKGROUND

Malware and other malicious threats, collectively, "threats", such as, hackers, intrusions, advanced persistent threats (APTs), such as 0 (zero) Day vulnerabilities (vulnerability in the software unknown to the vender which has not yet been fixed), and attacks, on networks are becoming increasingly common. Once malware or other threats enter a network, they spread, infecting numerous machines, causing countless damage to an enterprise, both in machines and man-hours having to isolate the threat, and reconstruct lost data, if this is even possible, as well as repair and/or replace damaged machines and/or machine components. Additionally, enterprises which suffer attacks typically lose consumer confidence, costing goodwill in potentially unlimited amounts. Presently, it takes an average of 300 days for a typical threat to be detected from the time it entered the network. In these 300 days, the threat has potentially spread across the entire network, causing untold damages in unlimited amounts to an enterprise.

SUMMARY OF THE DISCLOSED SUBJECT MATTER

The present invention includes embodiments that are directed to methods and systems, including devices, which allow for the rapid detection of malware and other threats, such as malicious intrusions and attacks. The present invention does so by detecting and analyzing lateral movement of the malware and other threats, malicious intrusions and attacks, rapidly, close to the time it entered the particular network, such as an enterprise network. "Lateral movement" is, for example, when a threat, malware or other infected machine has infected another machine and controls that infected machine, and so on. This analysis results in a rapid time to detection (TTD), in a very short time, for example 24 hours. By making this rapid detection, damage to machines on the enterprise network, is minimized, as chief information security officers (CISOs), system administrators, and the like, are made aware of the threats and can begin mitigation immediately, typically before the malware or other threat moves widely in the enterprise network.

Embodiments of the invention are directed to devices, which can be placed in or linked to core and other switches, to rapidly detect threats, such as malware, malicious intrusions, exploits, advanced persistent threats (APTs), such as 0 (zero) Day vulnerabilities (vulnerability in the software unknown to the vender which has not yet been fixed), attacks, threats generated from unauthorized users, and other harmful software (collectively referred to hereinafter as "threats").

Embodiments of the present invention are directed to a method for detecting movement of threats between machines. The method comprises: obtaining at least one packet corresponding to at least one packet transmitted between machines, for example, along a network such as a communications network; analyzing the at least one obtained packet for packet criteria; based on the packet criteria obtained from the analysis of the least one obtained packet, selecting at least one logical model defined to be characteristic of potential lateral movement of threats; and, analyzing the at least one obtained packet in accordance with the logic of the at least one logical model to determine a threat status of the potential lateral movement of the at least one obtained packet.

Optionally, the at least one logical model includes at least one logical tree.

Optionally, the at least one logical tree includes a single branch tree or a multiple branch tree.

Optionally, the at least one logical tree includes a plurality of logical trees.

Optionally, the plurality of logical trees includes at least one of: a plurality of single branch trees; a plurality of multiple branch trees; and, a combination of single branch trees and multiple branch trees.

Optionally, the method is such that, the obtaining the at least one packet includes copying at least one packet transmitted between the machines; and, the analyzing the at least one obtained packet for packet criteria includes: converting the copied at least one packet to a Packet Capture (PCAP) file; parsing the PCAP file; and, examining the parsed PCAP file for the at least one packet for detecting the packet criteria.

Optionally, the examining the parsed PCAP file for detecting the packet criteria includes deep packet inspection.

Optionally, the packet criteria are selected from the group consisting of: source Internet Protocol (IP) address; destination IP address; port; protocol; time; packet content; packet hex content; results of dissectors running on data; packet number; and, packet length.

Optionally, the at least one logical tree is formed of one or more of: regular expressions, fixed strings, integer numbers, floats, IP addresses, and requests including GET requests and POST requests.

Optionally, each of the branches of the single branch tree and the multiple branch tree is selected from the group of: regular expressions, fixed strings, integer numbers, floats, IP addresses, and requests including GET requests and POST requests.

Optionally, the analysis in accordance with the logic of the at least one logical tree includes assigning an integer value to define the threat status.

Optionally, the analysis in accordance with the logic of the at least one logical tree includes determining whether all of the integer values acquired during a predetermined period meet a threshold integer value.

Optionally, the method is such that if the threshold value is met or exceeded, issuing and alert and/or generating an organizational map of the threat between the machines.

Optionally, the threats comprise at least one of: malware, other malicious threats, hackers, intrusions, exploits, advanced persistent threats (APTs), such as 0 (zero) Day vulnerabilities, and attacks, threats generated from unauthorized users.

Embodiments of the present invention are directed to a computerized device for detecting movement of threats between machines, for example, machines on a network, such as a communications network. The device comprises: a storage medium for storing computer components; and, a processor for executing the computer components. The computer components comprise: a first computer component configured for obtaining at least one packet corresponding to at least one packet transmitted between machines; a second computer component configured for analyzing the at least one obtained packet for packet criteria; a third computer component configured for selecting at least one logical model defined to be characteristic of potential lateral movement of threats, based on the packet criteria obtained from the analysis of the least one obtained packet; and, a fourth computer component for analyzing the at least one obtained packet in accordance with the logic of the at least one logical model to determine a threat status of the potential lateral movement of the at least one obtained packet.

Optionally, the third computer component is additionally configured for selecting at least one logical model including at least one logical tree.

Optionally, the third computer component is additionally configured for selecting the at least one logical tree including at least one of a single branch tree or a multiple branch tree.

Optionally, the third computer component is additionally configured for selecting the at least one logical tree including a plurality of logical trees.

Optionally, the third computer component is additionally configured for selecting the at least plurality of logical trees, including at least one of: a plurality of single branch trees; a plurality of multiple branch trees; and, a combination of single branch trees and multiple branch trees.

Optionally, the computerized device is such that, the first computer component is additionally configured for copying at least one packet transmitted between the machines; and, the second computer component is additionally configured for analyzing the at least one obtained packet for packet criteria, by processes including: converting the copied at least one packet to a Packet Capture (PCAP) file; parsing the PCAP file; and, examining the parsed PCAP file for the at least one packet for detecting the packet criteria.

Optionally, the second computer component is additionally configured for examining the parsed PCAP file for detecting the packet criteria by performing deep packet inspection.

Optionally, the fourth computer component is additionally configured for analyzing the at least one obtained packet in accordance with the logic of the at least one logical tree includes assigning an integer value to define the threat status.

Optionally, the fourth computer component is additionally configured for analyzing the logic of the at least one logical tree by determining whether all of the integer values acquired during a predetermined period meet a threshold integer value.

Optionally, the fourth computer component is additionally configured to determine whether the threshold value is met or exceeded, and based on the determination, issuing and alert and/or generating an organizational map of the threat between the machines.

Optionally, the computerized device additionally comprises, a network interface card for providing access to the computerized device over a communications network.

Embodiments of the present invention are directed to a computer usable non-transitory storage medium having a computer program embodied thereon for causing a suitable programmed system to detect movement of threats between machines across one or more networks, by performing the following steps when such program is executed on the system. The steps comprise: obtaining at least one packet corresponding to at least one packet transmitted between machines; analyzing the at least one obtained packet for packet criteria; based on the packet criteria obtained from the analysis of the least one obtained packet, selecting at least one logical model defined to be characteristic of potential lateral movement of threats; and, analyzing the at least one obtained packet in accordance with the logic of the at least one logical model to determine a threat status of the potential lateral movement of the at least one obtained packet.

Optionally, the computer usable non-transitory storage medium is such that the at least one logical model includes at least one logical tree.

Optionally, the computer usable non-transitory storage medium is such that the at least one logical tree includes a single branch tree or a multiple branch tree.

Optionally, the computer usable non-transitory storage medium is such that the at least one logical tree includes a plurality of logical trees.

Optionally, the computer usable non-transitory storage medium is such that the plurality of logical trees includes at least one of: a plurality of single branch trees; a plurality of multiple branch trees; and, a combination of single branch trees and multiple branch trees.

Optionally, the computer usable non-transitory storage medium is such that the obtaining the at least one packet includes copying at least one packet transmitted between the machines; and, the analyzing the at least one obtained packet for packet criteria includes: converting the copied at least one packet to a Packet Capture (PCAP) file; parsing the PCAP file; and, examining the parsed PCAP file for the at least one packet for detecting the packet criteria.

Optionally, the computer usable non-transitory storage medium is such that the examining the parsed PCAP file for detecting the packet criteria includes deep packet inspection.

Optionally, the computer usable non-transitory storage medium is such that the packet criteria are selected from the group consisting of: source Internet Protocol (IP) address, destination IP address; port; protocol; time; packet content; packet hex content; results of dissectors running on data; packet number; and, packet length.

Optionally, the computer usable non-transitory storage medium is such that the at least one logical tree is formed of one or more of: regular expressions, fixed strings, integer numbers, floats, IP addresses, and requests including GET requests and POST requests.

Optionally, the computer usable non-transitory storage medium is such that each of the branches of the single branch tree and the multiple branch tree is selected from the group of: regular expressions, fixed strings, integer numbers, floats, IP addresses, and requests including GET requests and POST requests.

Optionally, the computer usable non-transitory storage medium is such that the analysis in accordance with the logic of the at least one logical tree includes assigning an integer value to define the threat status.

Optionally, the computer usable non-transitory storage medium is such that the analysis in accordance with the logic of the at least one logical tree includes determining whether all of the integer values acquired during a predetermined period meet a threshold integer value.

Optionally, the computer usable non-transitory storage medium is such that if the threshold value is met or exceeded, issuing and alert and/or generating an organizational map of the threat between the machines.

Optionally, the computer usable non-transitory storage medium is such that the threats comprise at least one of: malware, other malicious threats, hackers, intrusions, exploits, advanced persistent threats (APTs), such as 0 (zero) Day vulnerabilities, and attacks, threats generated from unauthorized users.

This document references terms that are used consistently or interchangeably herein. These terms, including variations thereof, are as follows.

"n" and "n$^{th}$" in the description below and the drawing figures represents the last member of a series or sequence of members, such as elements, servers, databases, caches, components, listings, links, data files, etc.

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smart phone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIGS. 5A and 5B are diagrams of the heuristics rules in accordance with the present invention;

FIGS. 6B-1, 6B-2 and 6B-3 are example decision (logical) trees, in an alternative embodiment of the invention, performed by the heuristics module; and, FIGS. 7A-7D are diagrams of the machine learning process of the present invention.

DETAILED DESCRIPTION OF THE INVENTION

Figure 1A:
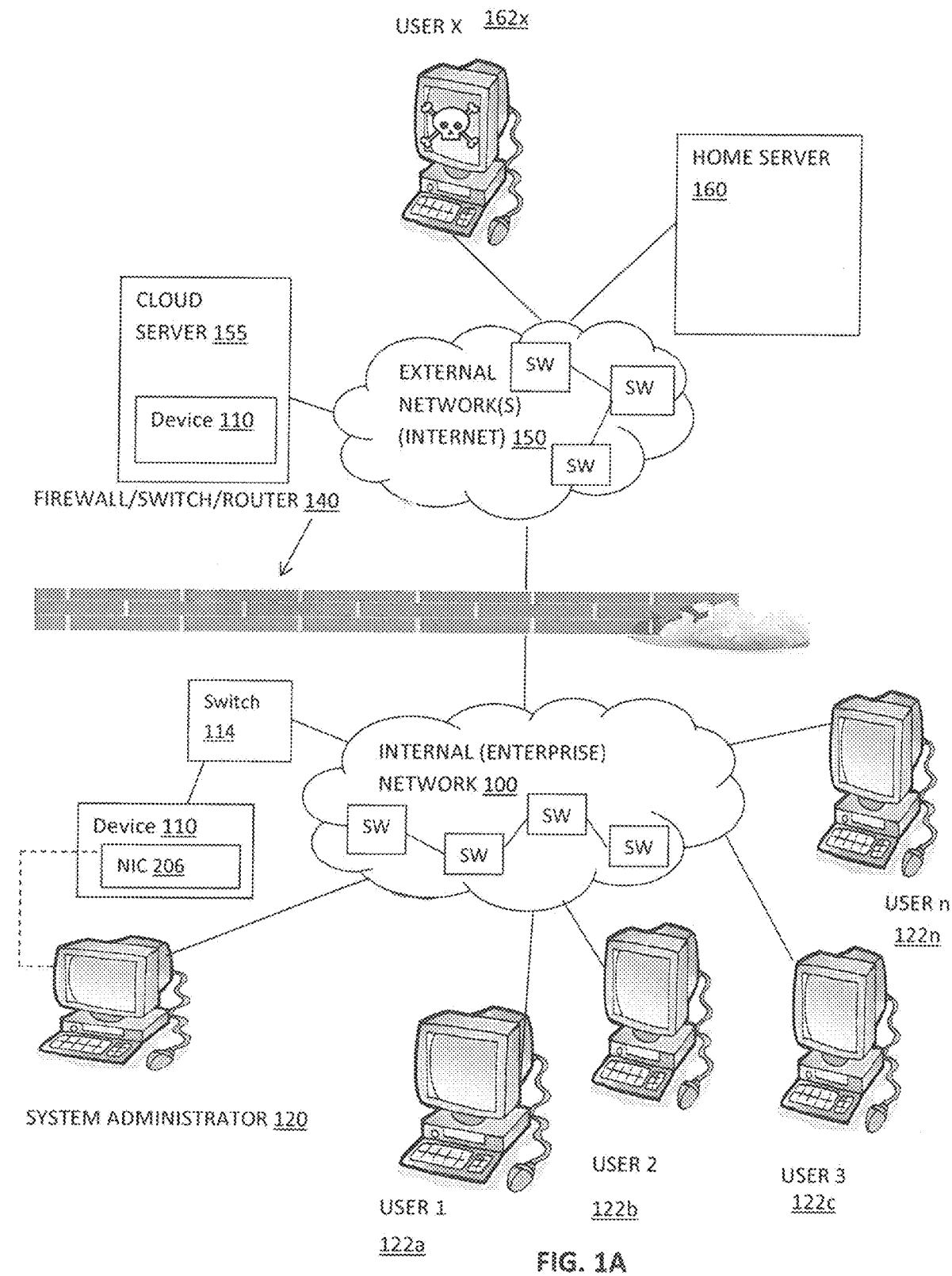
FIG. 1A is a diagram of an exemplary environment for the system in which embodiments of the disclosed subject matter are performed.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

Reference is now made to FIG. 1A, which shows an exemplary operating environment. This environment includes an internal (enterprise) network 100 which links to an external network 150, for example the Internet, via a firewall/switch/router 140.

On the internal network 100 side of the firewall 140, a device 110 (which is, for example, computerized), in accordance with embodiments of the present invention, is linked to a core switch/switch/port mirroring/Span/Tap 114. This core switch/switch/port mirroring/Span/tap 114 communicates with, typically by attaching or directly linking to, the device 110. A system administrator, represented by computer 120, accesses the device 110 through a network interface card (NIC) 206 (as shown by the broken line) Users, represented by computers (machines) 122a-122n of the internal network 100 are linked thereto.

A cloud server 155 links to the external network 150. The cloud server 155 also includes therein, or is linked to, a device 110 in accordance with the invention. A home server, or main server 160 associated with the devices 110, is linked to the External network(s) 150, to communicate with each device 110. The cloud server 155, functions, for example, to send a copy of each packet transmitted by the home server 160 (mapped to the cloud server 155), or other devices mapped to the cloud server 155, which then forwards the copied packets to the device 110. There are also users, represented by computer 162x, of the external network 150.

The network 100 is, for example, a Local Area Network (LAN). The network 150 is, for example, one or more communications networks, such as a Local Area Network (LAN), or a Wide Area Network (WAN), including public networks such as the Internet, and may also be a combination of networks and/or multiple networks including, for example, cellular networks. "Linked" as used herein includes both wired or wireless links, either direct or indirect, and placing the computers, including, servers, components and the like, in electronic and/or data communications with each other.

Figure 1B:
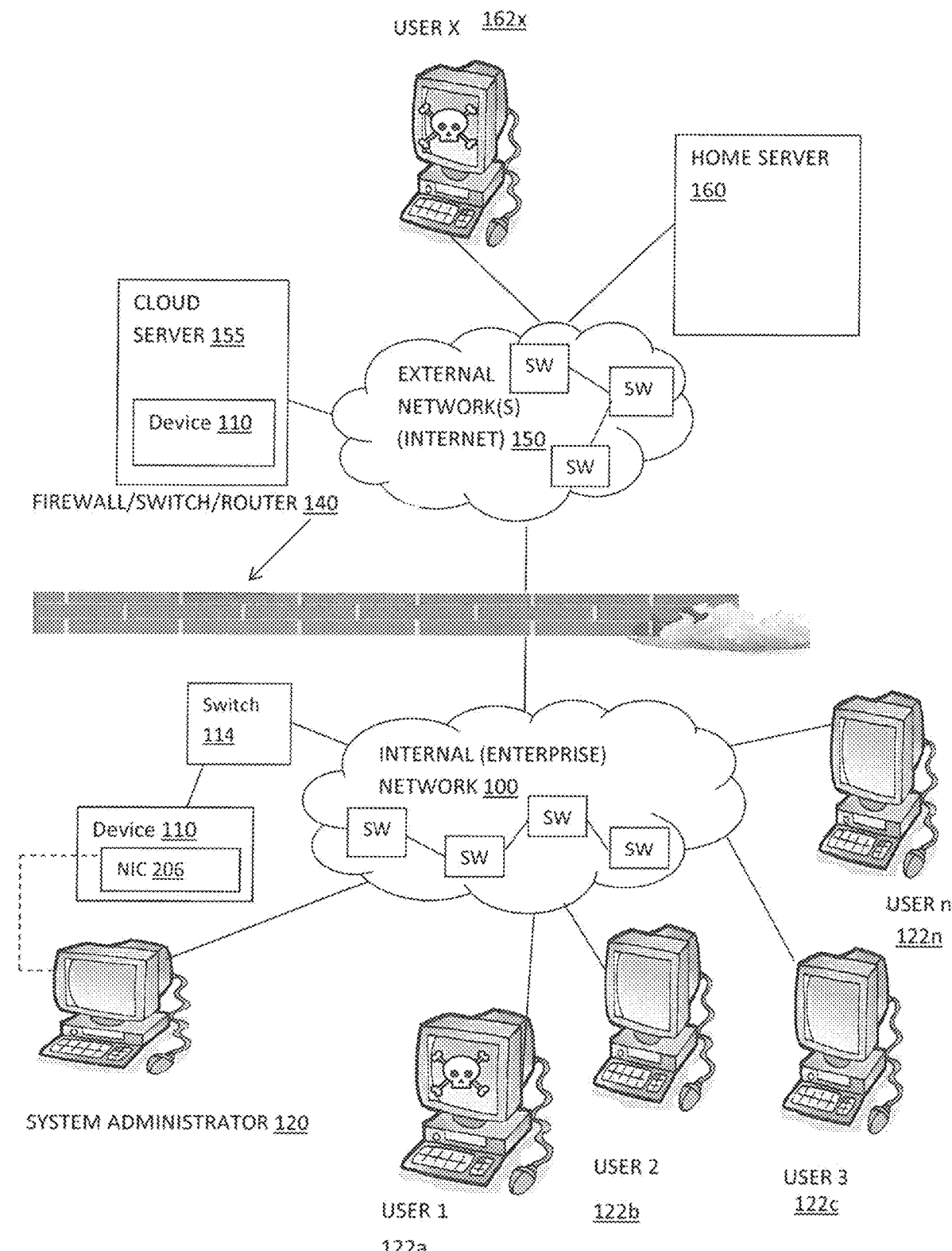
FIGS. 1B, 1C and 1D are diagrams of the environment of FIG. 1A illustrating lateral movement of a threat.
Figure 1C:
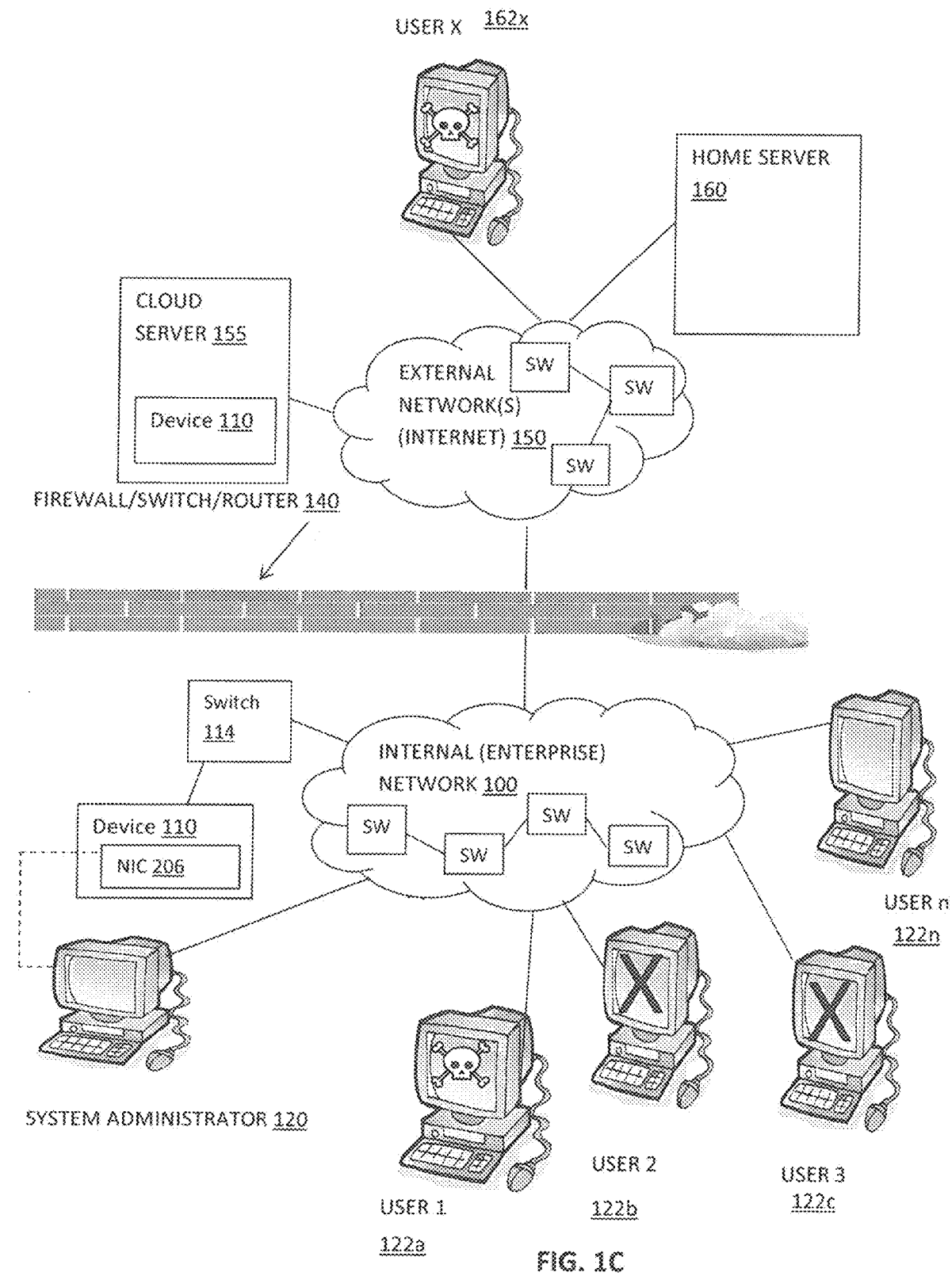
Figure 1D:
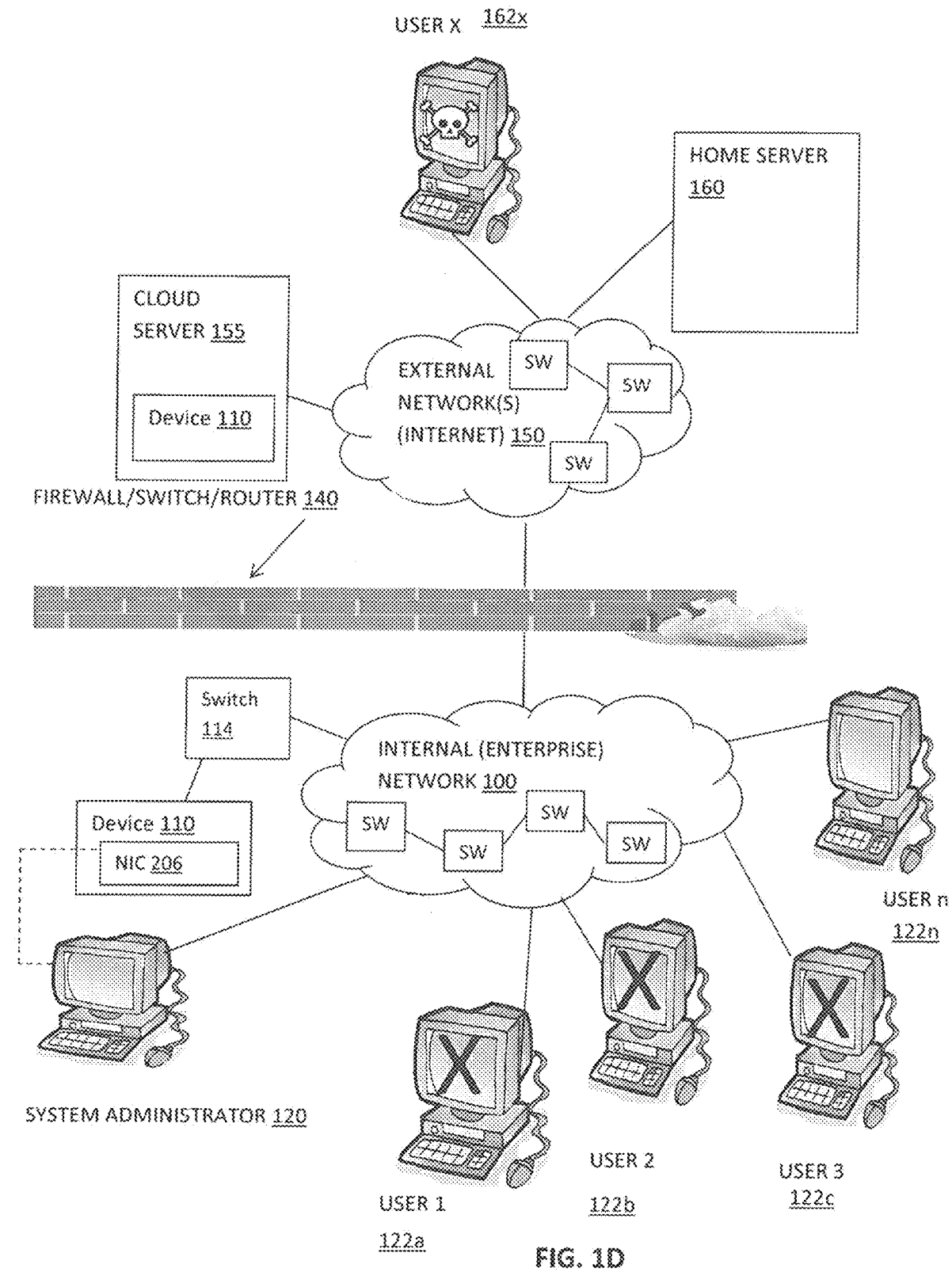

FIGS. 1B-1D are now described to show lateral movement of threats, which is detected by the systems and methods of the present invention. FIG. 1B shows an initial situation where computers 122a, in the internal network 100, and 162x, of the external network, are infected with a threat. Within the internal network 100 and the external network 150 are switches (SW) mapped to a device 110.

In FIG. 1C, the threat from computer 122a, has infected computers of the internal network 100, for example, computers 122b, 122c. The infection is indicated by an "X" over the machine(s). In FIG. 1D, the threat on the internal network 100 is from the from computer 162x of the external network 150. Computer 162x infected computers of the internal network 100, for example, computers 122a, 122b, 122c. This infection is indicated by an "X".

Figure 2:
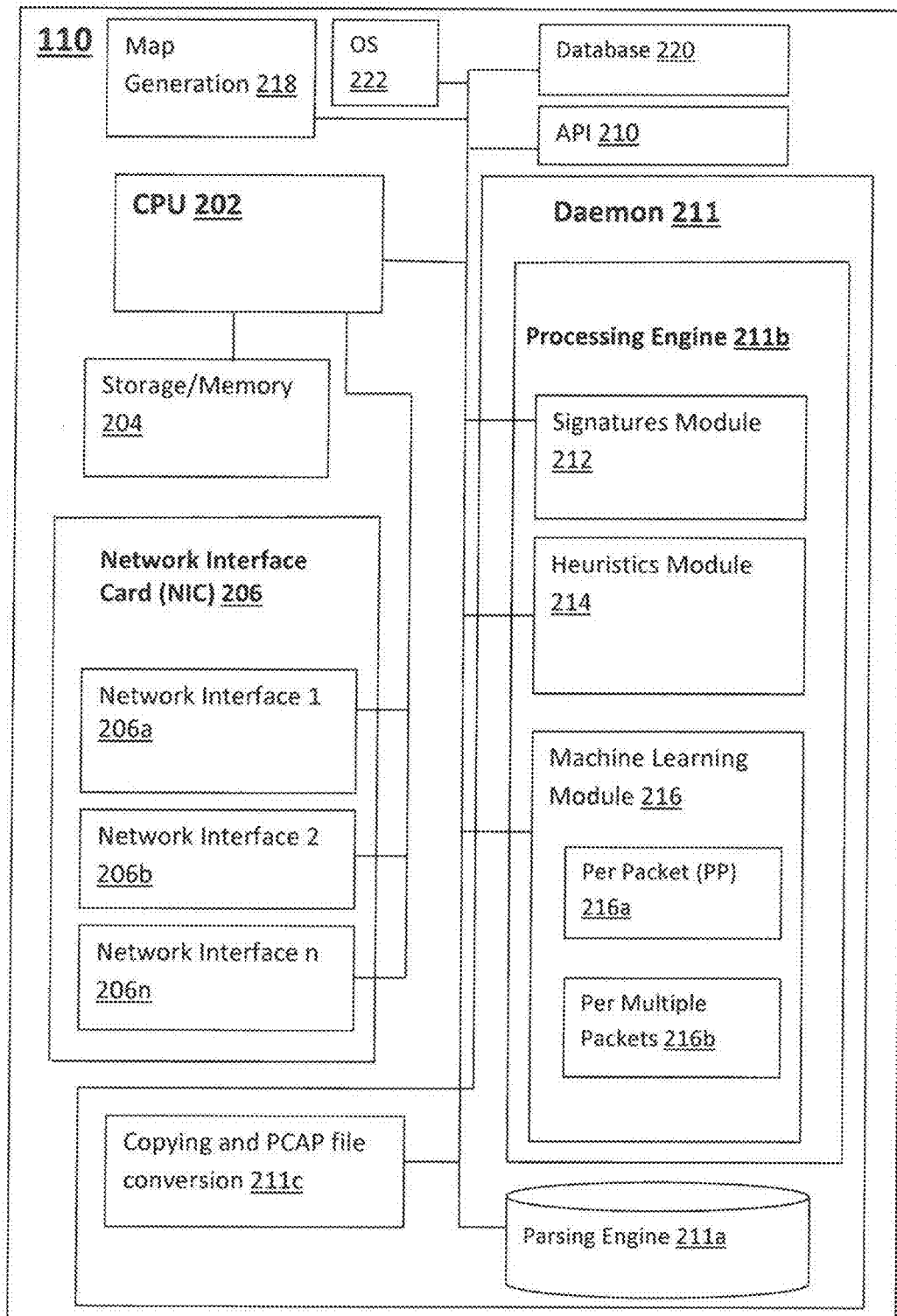
FIG. 2 is a diagram of the architecture of the device of the invention of FIG. 1A and the system thereof.

Attention is now directed to FIG. 2, which shows the architecture of the device 110, including the system of the device 110. This architecture of the device 110 includes a computerized processing unit 202, linked to and electronically connected, including in electronic and/or data communication, with each other, as well as with the storage/memory 204, and computer components including, a network interface card (NIC) 206 which includes network interfaces 206a-206n, an application programming interface (API) 210, a daemon 211, including a parsing engine 211a, and a processing engine 211b, which includes a signature module 212, a heuristics module 214 and a machine learning module 216, and a copying and converting module 211c, organizational map generator module 218, a storage media for databases 220, and an operating system (OS) 222. All of aforementioned components are linked to each other, either directly or indirectly, for electronic and/or data communication between any of these components. The Central Processing Unit (CPU) 202 is formed of one or more processors, including microprocessors, for performing the device 110 functions and operations detailed herein, including controlling the network interfaces 206a-206n, API 210, daemon 211, organizational map generator module 218, databases 220 and operating system 222.

The Central Processing Unit (CPU) 202 processors are, for example, conventional processors, including data processors and/or computing processors, such as those used in servers, computers, machines, and other computerized devices. For example, the processors may include x86 Processors from AMD and Intel, Xenon® and Pentium® processors from Intel, as well as any combinations thereof.

The storage/memory 204 is associated with the CPU 202, and is any conventional storage media. The storage/memory 204 stores machine executable instructions associated with the operation of the components, including components 206a-206n, 210, 211a, 211b (formed of components 212, 214, 216), and 211c, 218, 220 and 222, and all instructions for executing the processes of FIG. 3, detailed herein. The storage/memory 204 also, for example, stores rules and policies for the device 110. The processors of the CPU 202 and the storage/memory 204, although shown as a single component for representative purposes, may be multiple components, and may be outside of the device 110.

Network Interfaces 206a-206n are, for example, network interface cards (NICs), either as a single NIC 206 as shown, or multiple NICs.

The API (Application Programming Interface) 210 functions to push or pull data from the device 110. For example, the daemon 211 sends logs of its results through the API 210 to an SIEM (Security Incident Event Monitor), which is, for example, an external device.

The parsing engine 211a serves to parse PCAP files, or other parsable files associated with packets or representative of packets, including, for example, CAP, PCAP-ng files. For example, network data is converted into PCAP files and stored in a database of the storage media 220. Also, PCAP files are parsed into text files, and stored in a database of the storage media 220.

The processing engine 211b includes the signatures module 212, heuristics module 214 and the machine learning module 216. This processing engine 211b serves to process the parsed PCAP files in order to generate zero or more indicators, as integers (integer values), which are used to determine whether an alert is to be issued for a detected threat. The processing engine 211b, functions to detect packet criteria, for example, by grabbing flags and indicators from parsed packets before or after generating the text files. The indicators may include, for example, delimiters, source Internet Protocol (IP) addresses (with Internet Protocol (IP) as used herein being, for example, IP including IPv4 and IPv6), destination IP addresses, ports, protocols, times and timestamps, packet content, packet length, packet hex content, results of dissectors running on the data, the packet number, packet order, certain sources/destinations, packet data rules, such as having used a specific port, and the like. The processing engine 211b also performs various packet inspections, including deep packet inspection, to obtain the packet criteria from the parsed PCAP file for the respective packet. This data is, for example, then moved to the database 220, for storage.

The copying and conversion module 211c serves to obtain one or more packets, for example, from a machine to machine transmission, and to copy the obtained packets and convert these copied packets, for example into PCAP (packet capture) files, or other files, such as text, xml, and the like.

The signatures module 212 stores rules and policies for the device 110, to determine whether packets, portions of packets, or packet groups are/are not malicious. The signature module 212 includes numerous stored rules, which are typically fixed rules, having absolute answers based on inspection of the packet itself. These rules, for example, include those for various packet criteria, such as delimiters, Source Internet Protocol (IP) addresses, destination IP addresses, ports, protocols, times and timestamps, packet content, packet length, packet hex content, results of dissectors running on the data, the packet number, packet order, certain sources/destinations, packet data rules, such as having used a specific port. For example, strings are compared, integers, floats or other numbers are compared, and length of packet data is analyzed, so that a value is assigned, in the form of an integer, the value beginning at the integer "0".

The Heuristics module 214 analyzes risk, and operates by opening (applying) one or more logical models, for example, one or more logical trees, also known as decision trees. The logical trees used and the type of logical tree, combination and order is selected by algorithms applied by the heuristics module 214 or programmed into the heuristics module 214 by a system administrator or the like.

The logical trees are used to analyze single packets or groups of packets, to determine lateral movement of threats and/or potential threats. Logical trees as used in combinations and ordered within the combination, typically increase the chances for detecting the aforementioned lateral movement.

Figure 6A:
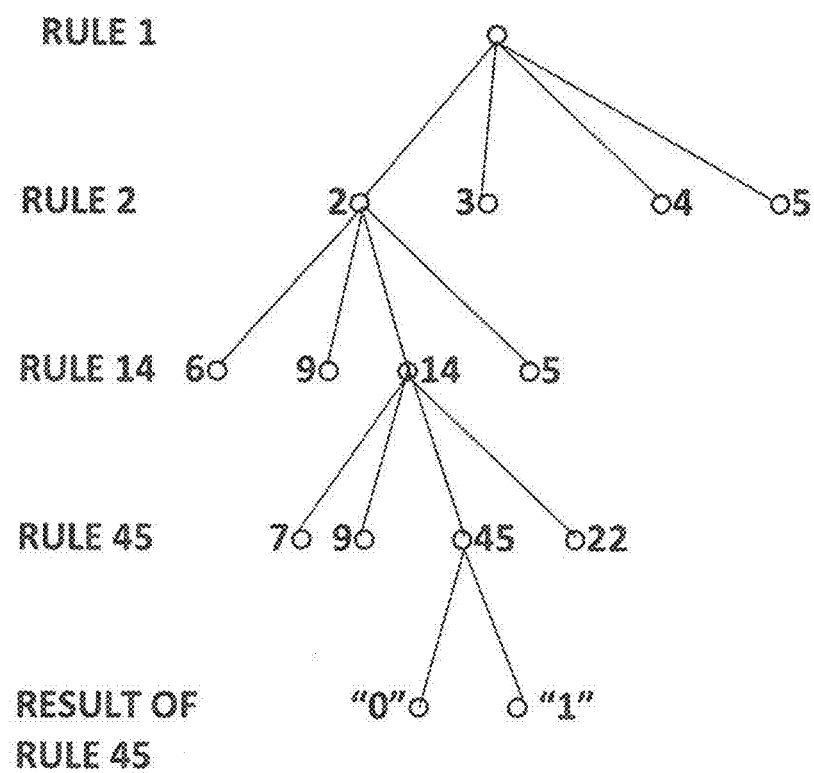
FIG. 6A is a decision tree used with the heuristics rules in accordance with the present invention.

The packets or packet groups are which are extracted for the logical (decision) tree(s) are extracted based on rules and policies, which are typically non-fixed rules, which require an analysis to obtain the answer. The packets, packet portions or packet groups, based on the aforementioned rules and policies, are assigned a score, a "0" if benign and allowed to pass, or a "1", to signal a potential threat or potentially malicious. Should a threat or potentially malicious packet be detected, the payload of the suspect packet or any other information is placed into an Alert Database, in the storage media 220, so that it can be seen by the system administrator 120. Accordingly, the integer from this module 214 will have a value of "0" or "1", as shown in FIGS. 5A, 5B and 6A, or alternatively, "0", "1", or "3", as shown in FIGS. 6B-1, 6B-2 and 6B-3, as detailed below.

The machine learning module 216 analyzes single packets 216a or packet groups 216b based on a training set of malicious/non malicious packets/packet groups, as well as cumulative knowledge, obtained from each analyzed packet/packet group for its being malicious/non malicious, in accordance with standard machine learning programs and scenarios. For example, individual packets, as well as groups of packets are subjected to analysis of a predetermined number of criteria. From the analysis, the packets and groups of packets are ranked against baselines of malicious and non-malicious packets/groups of packets, and then assigned an integer number, of zero or more.

Figure 4:
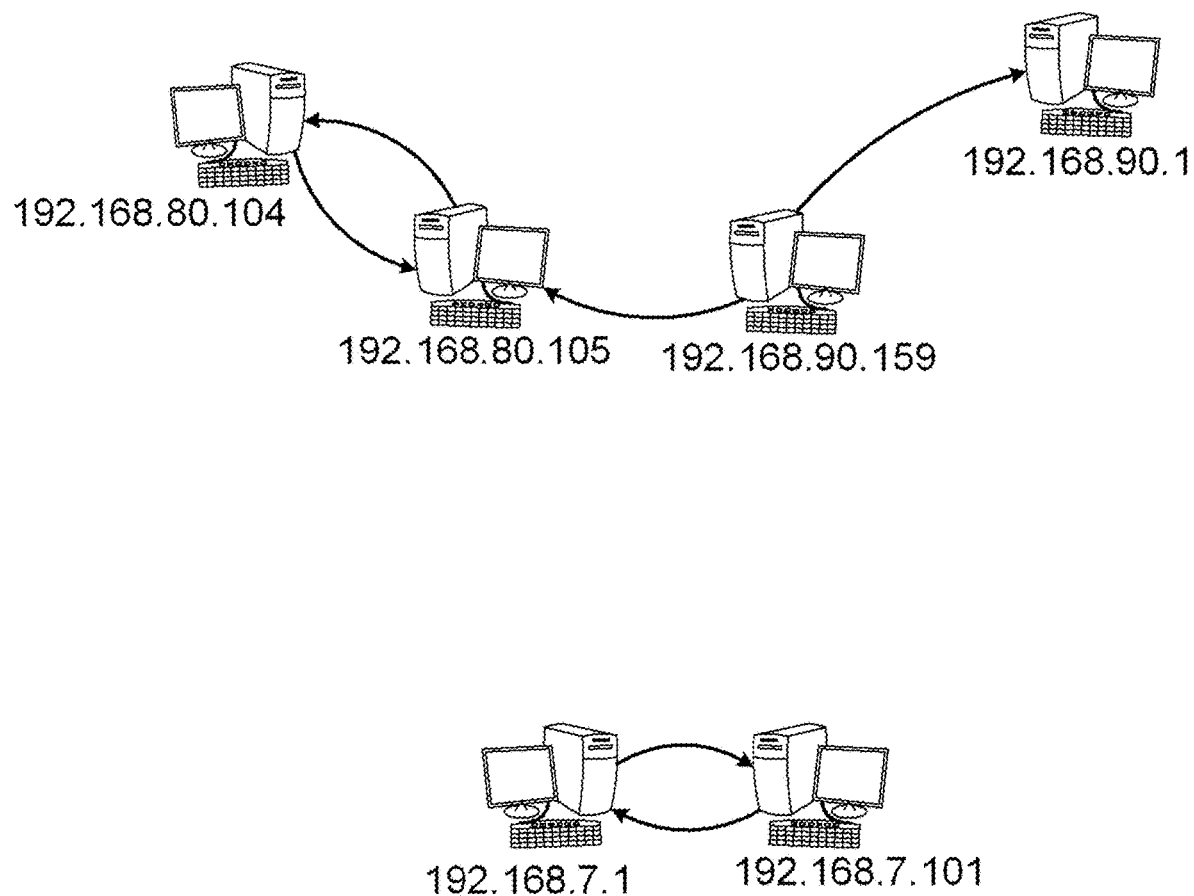
FIG. 4 is a diagram showing movement of threats in a network.

The organizational map generation module 218 operates with the CPU 202, storage/memory 204, and the database 220. Data is loaded from the database 220, which is used by the module 218, CPU 202, and storage/memory 204, to generate organizational maps, which show the lateral movement of threats and potential threats determined by the device 110. FIG. 4 shows an example organizational map.

Figure 3:
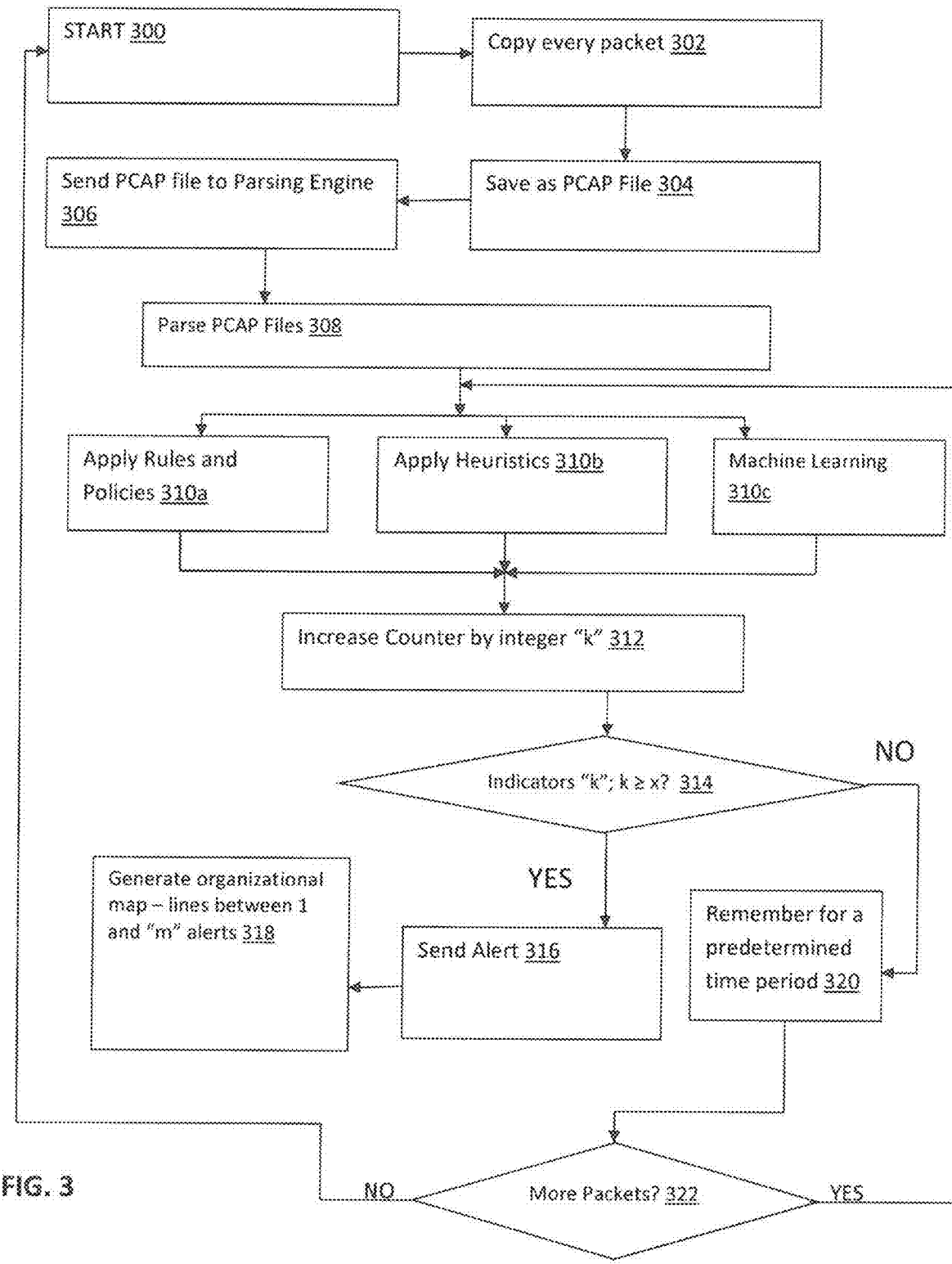
FIG. 3 is a flow diagram of an example process in accordance with embodiments of the present invention.

Attention is now directed to FIG. 3, which shows a flow diagram detailing computer-implemented processes in accordance with embodiments of the disclosed subject matter, to detect lateral movement of threats and/or characteristics of lateral movement of threats. Reference is also made to elements shown in FIGS. 1A-1D, and 2. The process and subprocesses of FIG. 3, include computerized processes performed by the device system. The aforementioned processes and sub-processes can be, for example, performed manually, automatically, or a combination thereof, and, for example, in real time. Reference is also made to the organizational map of FIG. 4, which is used in describing the process of FIG. 3, as detailed below.

The process of FIG. 3 begins at the START block 300. Here, the device 110 is monitoring the network 100, for example, device 110 via the core switch 114 is monitoring the internal (enterprise) network 100, for example, for packet transmissions between machines, e.g., computers 122a-122n. The process moves to block 302, where the system of the device 110, in the copying and conversion module 211c module, and makes a copy of every packet received from the network 100, for example, from the aforementioned packet transmission between machines. The now copied, and thus, obtained, packets, which correspond to those packets of the packet transmissions between machines, are converted to and saved (stored) as PCAP (packet capture) files, for example, as developed by TheTcpdump Team and documented at www.tcpdump.org, at block 304. Alternately, the copying may be done "on the fly" processing packets from a file or a data stream. Alternately, the copied files packets could be converted to text (TXT) files and stored similar to that for the PCAP files.

The process moves to block 306, where the PCAP files of various sizes, for example, of approximately 100 megabytes each, are moved to a parsing engine 211a, where the PCAP files are parsed at block 308. The parsing of the PCAP files is, for example, by packet, with each packet being a line of code. The parsed files are then sent to and processed contemporaneously, which may be simultaneously, by the processing engine 211b, and specifically for processing by the signature module 212, at block 310a, the heuristics module 214, at block 310b, and the Machine Learning Module 216, at block 310c. This processing engine 211b processes the parsed PCAP files in order to generate zero or more indicators, as integers (integer values), which are used to determine whether an alert is to be issued for a detected threat. While processing is typically by all three modules 212, 214, 216, processing may be by one or two of these modules 212, 214, 216.

At block 310a, the PCAP files are subjected to a signature evaluation, by analyzing the packets of the PCAP files against rules and policies. The signature module 212 applies, for example, the aforementioned fixed or "absolute" rules to the PCAP file's packets. These "absolute" rules are typically those with answers in absolute terms, such as "yes", "no", with an exact answer, figure or number, such as "Did you egress a device at port 555?". These "absolute" rules include, for example, those for packet length, certain sources/destinations, packet data rules, such as having used a specific port. For example, strings (e.g., fixed strings) are compared, integers (e.g., integer numbers), length of packet data, regular expressions, floats, IP addresses, requests, including GET requests and POST requests, are analyzed, so that a value is assigned, in the form of an integer of zero or more. The assigned integer value is indicative of a threat or a threat status.

For example, a rule answered affirmatively has a value of "1" and a rule answered negatively has a value of "0". If six rules were provided, four were answered affirmatively (e.g., rules 1, 3, 4 and 6), two were answered negatively (Rules 2 and 5), "k" for block 312 would be calculated as follows:

$$k=1(\text{Rule 1})+0(\text{Rule 2})+1(\text{Rule 3})+1(\text{Rule 4})+0(\text{Rule 5})+1(\text{Rule 6})=4$$

At block 310b, heuristics are applied, for example, via nodes of a decision tree, the result of the decision tree is classified as the integers "1" or "0" of the same integer values, respectively. As an example of a heuristics process performed by the system 110' of the device 110, reference is also made to FIGS. 5A, 5B and 6A.

Initially, a rule, such as Rule 1 with ID1, in FIG. 5A is applied to the packets of the parsed PCAP file. Rule 1 has four options, 2, 3, 4 and 5, which are also shown on the decision tree of FIG. 6A. Option "2" from Rule 1 is selected (underlined and bolded in FIG. 5B), so the process moves to Rule 2. Option "14" is selected (underlined and bolded in FIG. 5B and shown in the decision tree of FIG. 6A), so corresponding Rule 14 is now applied. Option "45" is now selected (underlined and bolded in FIG. 5B and shown in the decision tree of FIG. 6A), so Rule 45 is now applied. Rule 45 is a rule with empty options, so its application will result in a response of either "1" or "0", here for example, a "1" (shown in the decision tree of FIG. 6A). For example, if the result is a "1", "k+1" for block 312.

At Block 310b, an alternative process may also be performed, for example, by the heuristics module 214, using logical models in the form of logical or decision trees. This alternative process may be performed alone, absent a performance of the processes of blocks 310a and 310c, or performed contemporaneously, including simultaneously, with one or both of the processes of blocks 310a and 310c.

The logical trees may be used in various combinations, ranging from one logical tree to plural logical trees. These logical trees may be a single branch trees and multiple branch trees, of two or more branches. When a plurality of logical trees are used for packet analysis by the heuristics module 214, the plurality of trees may be formed form: 1) only single branch trees, 2) only multiple branch trees, or, 3) combinations of single branch trees and multiple branch trees. Each of the branches of the single branch tree and multiple branch trees, include, for example, strings (e.g., fixed strings), integers (e.g., integer numbers), length of packet data, regular expressions, floats, IP addresses, requests, and the like.

FIGS. 6B-1, 6B-2 and 6B-3 show examples of trees T1 (FIG. 6B-1), T2 (FIG. 6B-2) and T3 (FIG. 6B-3), which have been selected for example, based on type and in a combination and order by the Daemon 211 (via the heuristics module 214) by an algorithm, or by a system administrator or the like, and programmed into heuristics module 214. These logical trees are used to analyze a particular packet or sequence of packets, as transmitted between machines, for example, over a network. The types (single branch and multiple branch trees), combination and arrangement of the logical trees, for example logical trees T1, T2 and T3, as applied in the order T1, T2 and T3, is used to determine lateral movement of potential threats and/or threats, including, for example malware or the threat thereof, and also including, hackers, intrusions, exploits, advanced persistent threats (APTs), such as 0 (zero) Day vulnerabilities, threats generated from unauthorized users, and attacks. In FIGS. 6B-1, 6B-2 and 6B-3, as three trees T1, T2 and T3 are employed, each packet is analyzed by being run through all three trees in the order T1, followed by T2, followed by T3. The results of DONE equals the integer value 0 (k=0), SUSPICIOUS equals the integer value 1 (k=1) and, ALERT equals the integer value 3 (k=3), these integer values indicative of the status of threats (threat status).

Figures 1, 6B:
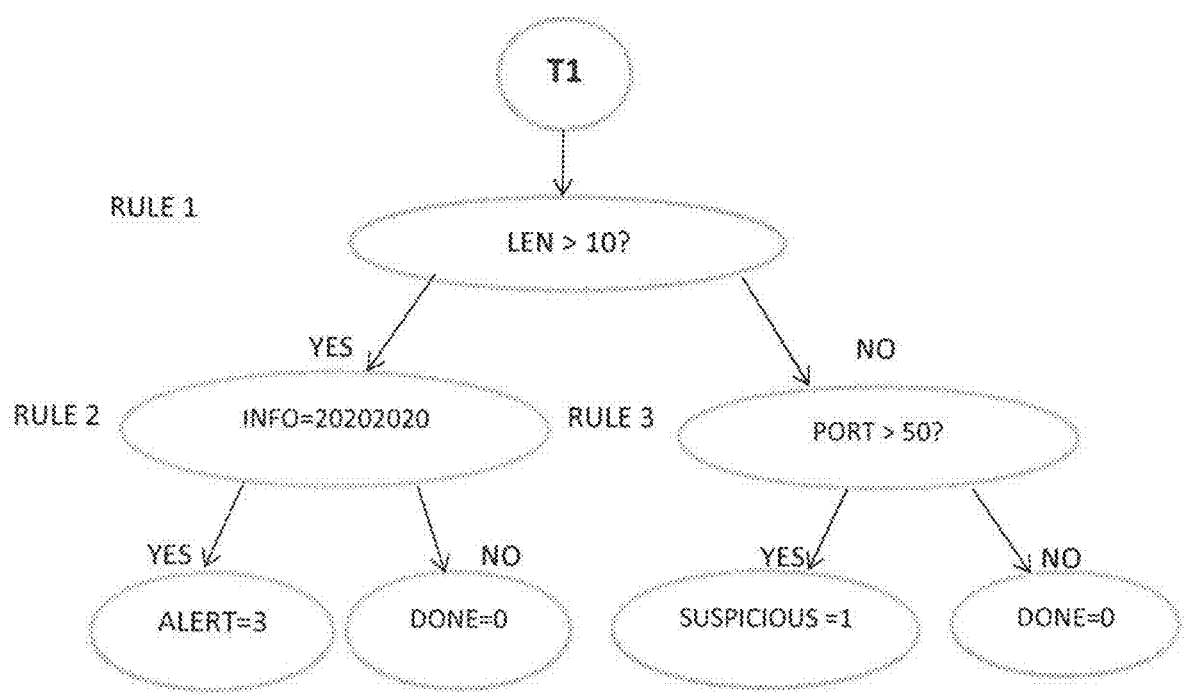
Figures 2, 6B:
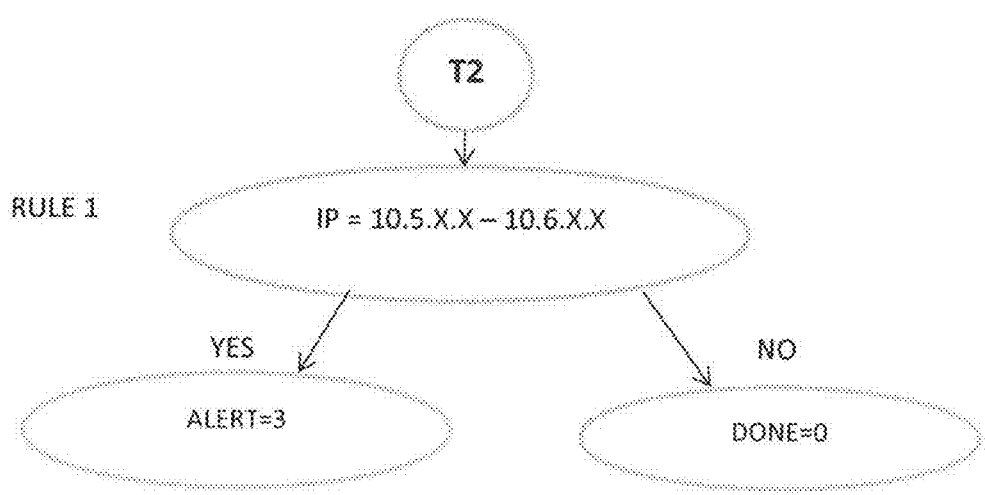
Figures 3, 6B:
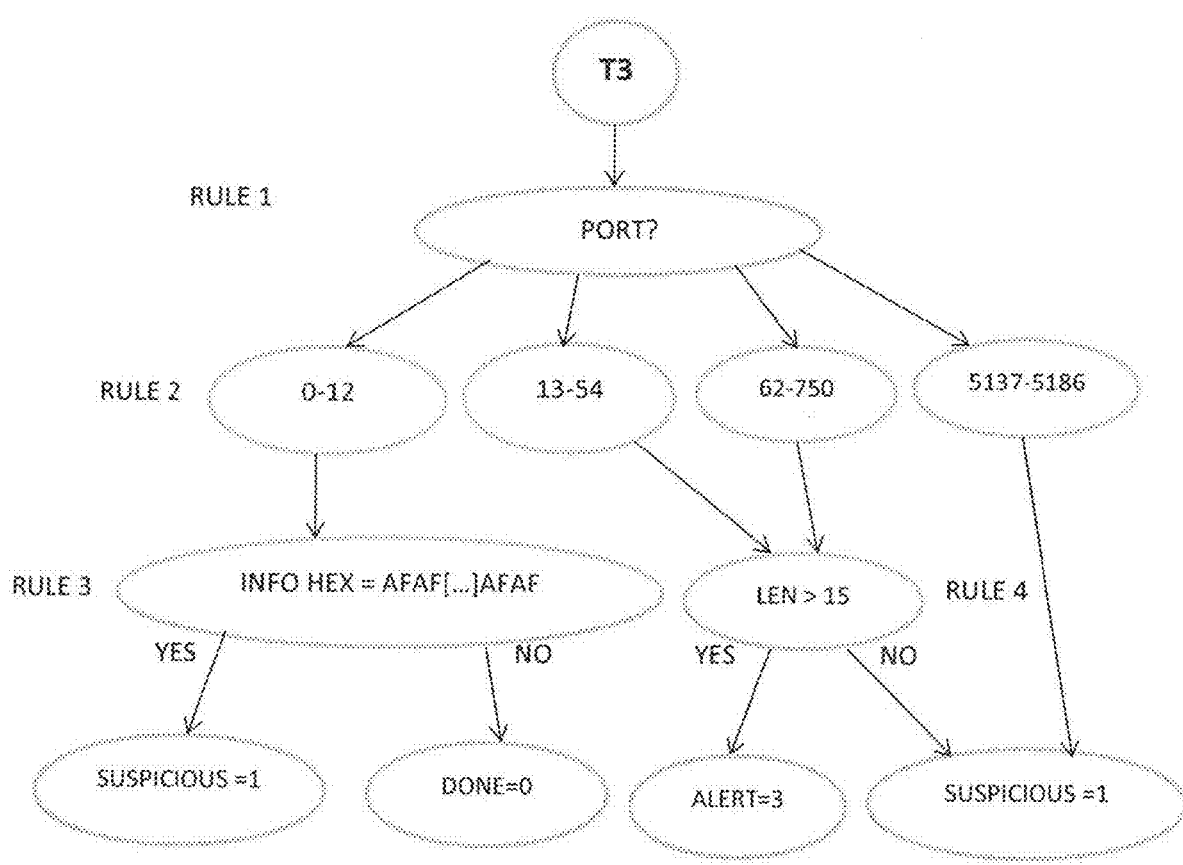

The packet is initially analyzed by first being applied at the first tree of the combination, T1, a multiple branch tree, as shown in FIG. 6B-1. Applying Rule 1 (R1) is determined whether the packet's length is greater than 10 (for example, 10 bytes). If YES to Rule 1, Rule 2 is applied to the packet, Rule 2 is the INFO (packet content, such as injected content of the packet, a specific piece of data, code, or the like) equal to 20202020. If YES to Rule 2, the result is ALERT with the integer value 3. If NO to Rule 2, the result is DONE, with an integer value of 0.

Returning to Rule 1, should the packet length be 10 bytes or less, Rule 3 is applied. Rule 3 determines whether the port for the packet is greater than Port No. 50. If YES the result is SUSPICIOUS, with an integer value of 1. If NO, the result is DONE, with an integer value of 0.

With the analysis from logical tree T1 complete, the analysis moves to the next logical tree of the combination as per the order, logical tree T2.

At Tree T2 (of FIG. 6B-2), a single branch tree, the packet is analyzed against Rule 1, where it is determined whether the IP address of the packet is in the range of 10.5.X.X to 10.6.X.X. If YES, the result is ALERT with the integer value 3. If NO, the IP address is not within the requisite range, and the result is DONE, with an integer value of 0.

With the analysis from logical tree T2 complete, the analysis moves to the next logical tree of the combination as per the order, logical tree T3.

At Tree T3, a multiple branch tree, as shown in FIG. 6B-3, the packet is analyzed against Rule 1, a Port number. If the Port number for the packet is 0-12, Rule 3 is to be applied. If the Port number is 15-34 or 62-750, Rule 4 is to be applied. If the Port number is 5137 to 5186, the result is SUSPICIOUS, with an integer value of 1.

Returning to Rule 3, should the INFO HEX of the packet be AFAF[ . . . ]AFAF, the result is SUSPICIOUS, with an integer value of 1. Should this packet not have the INFO HEX AFAF[ . . . ]AFAF of Rule 3, the result is DONE, with an integer value of 0.

Returning to Rule 4, should the packet length be greater than 15 (for example, 15 bytes), the result is ALERT, with an integer value of 3. However, in Rule 4, should the packet length be less than or equal to 15 bytes, the result is SUSPICIOUS, with an integer value of 1.

The Integer values of 0, 1 or 3, are summed from the analysis of the various trees (T1, T2 and T3), as T1 INT, T2 INT, T3 INT to obtain an integer sum (SUM INT), expressed as:

$$\text{SUM INT} = T1\ \text{INT} + T2\ \text{INT} = T3\ \text{INT}$$

the sum, e.g., SUM INT now the integer "k" of block 312, to which the process has moved to.

For example, should the result of Tree T1 be SUSPICIOUS, T2 be DONE and T3 be DONE, the sum is expressed as:

$$\text{SUM INT} = 1+0+0 = 1 = k$$

As another example, should the result of Tree T1 be ALERT, T2 be ALERT and T3 be ALERT, the sum is expressed as:

$$\text{SUM INT} = 3+3+3 = 9 = k$$

Also, since three ALERTs were generated from analysis of the packet by T1, T2 and T3, the number of alerts "m" is the integer 3, whereby three alerts will be sent, at block 316, and issued, at block 318, as m=3.

Still in another example, should the result of Tree T1 be SUSPICIOUS, T2 be DONE and T3 be ALERT, the sum is expressed as:

$$\text{SUM INT} = 1+0+3 = 4 = k$$

Here, the integer 4 includes a single multiple (m=1) of the threshold 3 (x=3), such that one alert will be sent at block 316, and issued, at block 318, as m=1.

Also in this case, at block 314, the threshold integer/integer value is set to the integer "3", whereby, x=3. When the Integer Value for "k" meets or exceeds the integer "3", the threshold $k=(x \geq 3)$ is met, resulting in an alert being sent at block 318, via block 316, with an organizational map produces of the lateral movement at block 318 (as detailed below). The number of alerts "m" depends on the integer number of the multiple of "the integer value "x", which is, for example, x=3.

Moving to block 310c, a machine learning process is applied in order to determine zero or more integers, indicative of threats in the system (network). For example, individual packets, as well as groups of packets are subjected to analysis of a predetermined number of criteria of features or rules. For example, each packet and packet group may be subjected to numbers of features, for example 100+ features. The results of these features are analyzed and ranked against baselines of malicious and non-malicious packets/groups of packets, and then assigned an integer number of zero or more.

An example of the machine learning process is illustrated in FIGS. 7A-7D. Initially, via training of the machine of with 100,000+ samples in malicious PCAP files there were "755" of the number "20" from the malicious baseline, and 122 of the number "20", which were from the benign baseline. A new packet is now analyzed in accordance with the rule or feature, Q1—"Number of "20" in the packet." The response is 535. This is shown in FIG. 7A.

In FIG. 7B, 755 is now a high, and 122 is a low, with this scale normalized to zero through 10. In FIG. 7C, 535 is plotted on the scales, and results in an 8.4 on the scale of 0 through 10. This 8.4 is a "literal value" as represented on the table of FIG. 7D, along with other literal values from other rules or features Q1-Qn. Each literal value may be assigned a weight, depending on the importance of the rule. The sum of all of the values (literal y weighs) is then calculated. An average value (A) for each of the rules Q1-Qn, is calculated, for example, from data in FIG. 7D, in accordance with the following Equation:

$$A=\Sigma_{Q1\text{-}Qn}[LV\cdot(\text{integer value of weight})]/\text{number of rules } (Qn)$$

Accordingly, $$A=[(8.4)(2)+(6.3)(5)+(5.4)(1)+(1.2)(9)+(6.6)(4)]/5$$

$$A=18.18$$

For example, if A=18.18, and the threshold is the integer "18", with this "18" being an internal threshold for the machine learning engine of block 310c, such that 18 (as the decimal places are truncated from A=18.18) divided by 18, gives the integer value of "+1" or "1" for block 310c.

Block 312, from blocks 310a, 310b and 310c, with zero or more indicators produced, here, for example, k=6 as follows:

$$k=4(\text{block } 310a)+1(\text{block } 310b)+1(\text{block } 310c)=6.$$

The process moves to block 312, where the number of indicators, expressed as integers "k" from processes 310a-310c for the packet (e.g., packet copy) being analyzed, is determined. The process moves to block 314, where it is determined whether the number of indicators, expressed as an integer "k", is greater than or equal to "x", where "x" is a predetermined threshold, and typically integer, typically set at "3", as "3" detected threats is a basis (threshold) for lateral movement having been detected. This value for "k" and the information associated with its analysis may also be stored, for example, in a database, such as database 220.

At block 314, should "k" (an integer/integer value) not be greater than or equal to "x" (an integer/integer value), typically "k" is less than 3, and x=3, the integer 3 for x being the threshold value for an alert to be issued, the process moves to block 320, which is discussed below. At block 314, should the integer "k" be greater than or equal to "x", for example k≥3 when x=3, the process moves to block 316. At block 316, an alert is issued, and sent.

The processes of blocks 312, 314 and 316 are performed, for example, by the CPU 202, based on instructions stored in or programmed into the storage/memory 204. The process moves from block 316 to block 318. At block 318, an organizational map is generated, for example, by the map generation module 218. The organizational map generated is, for example, shown in FIG. 4. The organizational map, by virtue of the arrows, shows movement of a between 1 and "m" (an integer number corresponding to the number of alerts sent) threats between computers, machines, computer components, and the like, in the network, accordingly, showing the organization where threats have spread between which computers, machines, computer components, and the like, in the organization's network.

For example, in FIG. 4, the organizational map shows that the computer with IP (Internet Protocol) number 192.168.90.159, moves laterally and controls computers of IP's 192.168.90.1 and 192.168.80.105. Computer of IP 192.168.80.105, moves laterally and controls computer of IP 192.168.80.104, and forcing IP 192.168.80.104 to reply. These computers of IP 192.168.80.105, controls computer of IP 192.168.80.104 are considered a "match" or a "pair".

Here, the detected threats can now be mitigated, by processes including sending information to a NAC (Network Access Control), SIEM (Security Information Events Manager), or any other security device.

Returning to block 314, if the indicators (integer value "k" thereof) have not met the threshold (threshold integer value "x"), the process moves to block 320, where the present number of indicators (the integer value "k") is stored for a time period. The process moves to block 322, where it is determined if there are more packets to be analyzed. If yes, the process moves to one or more of blocks 310a-310c, where it resumes as above. If no, the process moves to block 300, from where it restarts.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, microprocessors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for detecting movement of threats between machines comprising:
   obtaining at least one packet corresponding to at least one packet transmitted between machines including copying the at least one packet transmitted between the machines;
   analyzing the at least one obtained packet for packet criteria including:
   converting the copied at least one packet to a Packet Capture (PCAP) file;
   parsing the PCAP file; and,
   examining the parsed PCAP file for the at least one packet for detecting the packet criteria;
   based on the packet criteria obtained from the analysis of the least one obtained packet, selecting at least one logical model which is characteristic of potential lateral movement of threats;
   selecting at least one logical tree for the at least one logical model; and,
   analyzing data from the at least one obtained packet in the at least one logical tree to determine a status of the potential lateral movement of threats by the at least one obtained packet.

2. The method of claim 1, wherein the at least one logical tree includes a single branch tree or a multiple branch tree.

3. The method of claim 2, wherein the at least one logical tree includes a plurality of logical trees.

4. The method of claim 3, wherein the plurality of logical trees includes at least one of: a plurality of single branch trees: a plurality of multiple branch trees; and, a combination of single branch trees and multiple branch trees.

5. The method of claim 2, wherein the at least one logical tree is formed of one or more of: regular expressions, fixed strings, integer numbers, floats, IP addresses, and requests including GET requests and POST requests.

6. The method of claim 2, wherein each of the branches of the single branch tree and the multiple branch tree is selected from the group of: regular expressions, fixed strings, integer numbers, floats, IP addresses, and requests including GET requests and POST requests.

7. The method of claim 1, wherein the examining the parsed PCAP file for detecting the packet criteria includes deep packet inspection.

8. The method of claim 7, wherein the packet criteria are selected from the group consisting of:
   Source Internet Protocol (IP) address;
   Destination IP address;
   Port;
   Protocol;
   Time;
   Packet content;
   Packet hex content;
   Results of dissectors running on data;
   Packet Number; and,
   Packet Length.

9. The method of claim 1, wherein the analysis in accordance with the logic of the at least one logical tree includes assigning an integer value to define the threat status.

10. The method of claim 9, wherein the analysis in accordance with the logic of the at least one logical tree includes determining whether all of the integer values acquired during a predetermined period meet a threshold integer value.

11. The method of claim 10, wherein if the threshold value is met or exceeded, issuing an alert and/or generating an organizational map of the threat between the machines.

12. The method of claim 1, wherein the threats comprise at least one of: malware, other malicious threats, hackers, intrusions, exploits, advanced persistent threats (APTs) including 0 (zero) Day vulnerabilities, and, attacks and threats generated from unauthorized users.

13. The method of claim 1, wherein the at least one logical model is based on one of more of heuristics, rules and policies, and/or machine learning.

14. A computerized device for detecting movement of threats between machines comprising:
   a storage medium for storing computer components; and,
   a processor for executing the computer components, the computer components comprising:
   a first computer component configured for obtaining at least one packet corresponding to at least one packet transmitted between machines, and, copying the at least one packet transmitted between the machines;
   a second computer component configured for analyzing the at least one obtained packet for packet criteria, including:
   converting the copied at least one packet to a Packet Capture (PCAP) file;
   parsing the PCAP file; and,
   examining the parsed PCAP file for the at least one packet for detecting the packet criteria;
   a third computer component configured for:
   1) selecting at least one logical model which is characteristic of potential lateral movement of threats, based on the packet criteria obtained from the analysis of the least one obtained packet, and, 2) selecting at least one logical tree for the at least one logical model; and,
   a fourth computer component for analyzing the at least one obtained packet in the at least one logical tree to determine a status of the potential lateral movement of threats by the at least one obtained packet.

15. The computerized device of claim 14, wherein the third computer component is additionally configured for selecting the at least one logical tree including at least one of a single branch tree or a multiple branch tree.

16. The computerized device of claim 15, wherein the third computer component is additionally configured for selecting the at least one logical tree including a plurality of logical trees.

17. The computerized device of claim 16, wherein the third computer component is additionally configured for selecting the at least a plurality of logical trees, including at least one of: a plurality of single branch trees; a plurality of multiple branch trees; and, a combination of single branch trees and multiple branch trees.

18. The computerized device of claim 14, wherein the second computer component is additionally configured for examining the parsed PCAP file for detecting the packet criteria by performing deep packet inspection.

19. The computerized device of claim 14, wherein the fourth computer component is additionally configured for analyzing the at least one obtained packet in accordance with the logic of the at least one logical tree includes assigning an integer value to define the threat status.

20. The computerized device of claim 19, wherein the fourth computer component is additionally configured for analyzing the logic of the at least one logical tree by determining whether all of the integer values acquired during a predetermined period meet a threshold integer value.

21. The computerized device of claim 20, wherein the fourth computer component is additionally configured to determine whether the threshold value is met or exceeded, and based on the determination, issuing an alert and/or generating an organizational map of the threat between the machines.

22. The computerized device of claim 14, additionally comprising, a network interface card for providing access to the computerized device over a communications network.

23. The computerized device of claim 14, wherein the at least one logical model is based on one of more of heuristics, rules and policies, and/or machine learning.

24. A computer usable non-transitory storage medium having a computer program embodied thereon for causing a suitably programmed system to detect movement of threats between machines across one or more networks, by performing the following steps when such program is executed on the system, the steps comprising:
obtaining at least one packet corresponding to at least one packet transmitted between machines including copying the at least one packet transmitted between the machines;
analyzing the at least one obtained packet for packet criteria including:
converting the copied at least one packet to a Packet Capture (PCAP) file;
parsing the PCAP file; and,
examining the parsed PCAP file for the at least one packet for detecting the packet criteria;
based on the packet criteria obtained from the analysis of the least one obtained packet, selecting at least one logical model which is characteristic of potential lateral movement of threats;
selecting at least one logical tree for the at least one logical model; and,
analyzing data from the at least one obtained packet in the at least one logical tree to determine a status of the potential lateral movement of threats by the at least one obtained packet.

25. The computer usable non-transitory storage medium of claim 24, wherein the at least one logical tree includes a single branch tree or a multiple branch tree.

26. The computer usable non-transitory storage medium of claim 25, wherein the at least one logical tree includes a plurality of logical trees.

27. The computer usable non-transitory storage medium of claim 26, wherein the plurality of logical trees includes at least one of: a plurality of single branch trees; a plurality of multiple branch trees; and, a combination of single branch trees and multiple branch trees.

28. The computer usable non-transitory storage medium of claim 25, wherein the at least one logical tree is formed of one or more of: regular expressions, fixed strings, integer numbers, floats, IP addresses, and requests including GET requests and POST requests.

29. The computer usable non-transitory storage medium of claim 25, wherein each of the branches of the single branch tree and the multiple branch tree is selected from the group of: regular expressions, fixed strings, integer numbers, floats, IP addresses, and requests including GET requests and POST requests.

30. The computer usable non-transitory storage medium of claim 24, wherein the examining the parsed PCAP file for detecting the packet criteria includes deep packet inspection.

31. The computer usable non-transitory storage medium of claim 30, wherein the packet criteria are selected from the group consisting of: Source Internet Protocol (IP) address; Destination IP address; Port; Protocol; Time; Packet content; Packet hex content; Results of dissectors running on data; Packet Number; and, Packet Length.

32. The computer usable non-transitory storage medium of claim 24, wherein the analysis in accordance with the logic of the at least one logical tree includes assigning an integer value to define the threat status.

33. The computer usable non-transitory storage medium of claim 32, wherein the analysis in accordance with the logic of the at least one logical tree includes determining whether all of the integer values acquired during a predetermined period meet a threshold integer value.

34. The computer usable non-transitory storage medium of claim 33, wherein if the threshold value is met or exceeded, issuing an alert and/or generating an organizational map of the threat between the machines.

35. The computer usable non-transitory storage medium of claim 24, wherein the threats comprise at least one of: malware, other malicious threats, hackers, intrusions, exploits, advanced persistent threats (APTs) including 0 (zero) Day vulnerabilities, and, attacks and threats generated from unauthorized users.

36. The computer usable non-transitory storage medium of claim 24, wherein the at least one logical model is based on one of more of heuristics, rules and policies, and/or machine learning.

* * * * *